United States Patent [19]

Hammer et al.

[11] Patent Number: 5,595,796
[45] Date of Patent: Jan. 21, 1997

[54] FOODSTUFF CASING BASED ON CELLULOSE HYDRATE WITH IMPROVED PEELABILITY

[75] Inventors: Klaus-Dieter Hammer, Mainz; Manfred Siebrecht; Theo Krams, both of Wiesbaden, all of Germany

[73] Assignee: Hoechst Aktiengesellschaft, Frankfurt, Germany

[21] Appl. No.: 248,875

[22] Filed: May 25, 1994

[30] Foreign Application Priority Data

Mar. 4, 1994 [DE] Germany ............... 44 07 288.0

[51] Int. Cl.⁶ ............... F16L 11/08; A22C 13/00
[52] U.S. Cl. ............... 428/34.8; 138/118.1; 206/802; 427/338
[58] Field of Search ............... 428/34.8; 138/118.1; 229/DIG. 10; 206/802; 427/338

[56] References Cited

U.S. PATENT DOCUMENTS

| | | | |
|---|---|---|---|
| 1,978,774 | 10/1934 | Voss et al. | 17/45 |
| 2,901,358 | 8/1959 | Underwood et al. | 99/176 |
| 3,385,840 | 5/1968 | Natta et al. | 260/88.2 |
| 3,582,364 | 6/1971 | Rose et al. | 99/176 |
| 3,867,182 | 2/1975 | Hammer et al. | 117/95 |
| 3,945,404 | 3/1976 | Yamamatsu et al. | 138/118.1 |
| 4,948,856 | 8/1990 | Minchak et al. | 526/281 |
| 5,199,465 | 4/1993 | Stiem | 138/118.1 |
| 5,358,784 | 10/1994 | Hammer et al. | 428/34.8 |
| 5,370,914 | 12/1994 | Hammer et al. | 428/34.8 |

FOREIGN PATENT DOCUMENTS

| | | |
|---|---|---|
| 0468284 | 1/1992 | European Pat. Off. . |
| 0503422 | 9/1992 | European Pat. Off. . |
| 2667867 | 4/1992 | France . |
| 609129 | 1/1935 | Germany . |
| 1492699 | 10/1969 | Germany . |
| 1492708 | 4/1972 | Germany . |
| 3447026 | 7/1986 | Germany . |
| 3835044 | 4/1990 | Germany . |
| 3922546 | 1/1991 | Germany . |
| 4127604 | 2/1993 | Germany . |
| 1440486 | 6/1976 | United Kingdom . |

*Primary Examiner*—Charles R. Nold
*Attorney, Agent, or Firm*—Foley & Lardner

[57] ABSTRACT

The invention relates to an optionally fiber-reinforced foodstuff casing based on cellulose hydrate, which is impregnated on the inside with a mixture containing 40 to 200 mg/m² of an adhesive component and 20 to 2000 mg/m² of a non-stick component. The ratio by weight of adhesive to non-stick component is between 4:1 and 1:4. The foodstuff casing is used as sausage casing, in particular for keeping sausage, which has a second packaging in the form of a film or is provided with a dip coating. The casing shows improved peelability.

12 Claims, No Drawings

FOODSTUFF CASING BASED ON CELLULOSE HYDRATE WITH IMPROVED PEELABILITY

BACKGROUND OF THE INVENTION

The invention generally relates to a foodstuff casing based on cellulose hydrate, which displays improved peelability, and to the use thereof as sausage casing.

DESCRIPTION OF RELATED ART

Flat, in particular in the form of substrates such as webs and sheets, and tubular foodstuff casings based on cellulose hydrate are usually produced by the viscose process. This entails an alkaline cellulose xanthate solution, which is called "viscose solution" being extruded through an annular or slot die. The extruded solution is then coagulated in acid solution as cellulose hydrate gel and regenerated to cellulose hydrate. It is possible by altering the viscose composition and incorporating additives to change the properties of the foodstuff casing. These alterations can be carried out both on reinforced and on non-reinforced casings. Non-reinforced cellulose hydrate casings are called cellulose films and are known as Cellophane®. Coating one or both sides of a web-form or tubular fiber framework with a viscose solution, impregnating and subsequently treating with a coagulation and regeneration solution results in fiber-reinforced foodstuff casings. Casings of this type are used in particular for naturally ripened and mold-ripened keeping sausage.

Foodstuff casings carry out important functions in the manufacture, ripening and storage of the sausage. They must be supple, sufficiently extensible and storable for a long time.

The suppleness and processability of the casing is normally improved by "secondary" plasticizers such as glycerol, glycol or polyglycol. The secondary plasticizers are bound to the cellulose hydrate not covalently but only by intermolecular forces. They are virtually completely dissolved out on moistening the casing before filling, or on scalding or boiling the sausage. The consequence of this is shrinkage, compaction and embrittlement of the casing after the drying of the sausage. The shrinkage may lead to the pressure inside the sausage rising to undesirably high values causing the sausages to burst. These manifestations are attributable to a crystallization of the cellulose hydrate.

In order to reduce the tendency to crystallize, so-called "primary" plasticizers are also added to the viscose solution and bring about permanent plasticization. The compounds used as primary plasticizers, such as N-($C_9$–$C_{24}$)alkyl-N,N', N'-trishydroxymethylurea or similar compounds with long aliphatic carbon chains, react with the cellulose molecules. However, unreactive compounds such as di- and polyhydroxy compounds which are esterified with long-chain aliphatic monocarboxylic acids, or polymers based on alkylene oxides with at least one N-hydroxymethylcarbamate group, are also used.

A sausage casing based on cellulose hydrate whose inner surface is not impregnated generally adheres to a scalded sausage so firmly that it cannot be pulled off without simultaneously tearing open the surface of the filling. By contrast, its adhesion to keeping sausage is so small that it becomes detached from the surface of the filling during ripening, does not shrink therewith and forms creases under which mold is able to develop.

Casings for scalded sausages were therefore prepared on the inside with non-stick compositions. Examples of non-stick preparations which have been used are chromium/fatty acid complexes (U.S. Pat. No. 2,901,358), mixtures of a lower alkylcellulose and the dimer of a higher ketene (DE-A 14 92 699), fluorinated, cross-linked polymers (DE-A 22 59 671 which is the equivalent of GB-A 1 440 486) and a mixture of lecithin and alginate, chitosan and/or casein.

Gelatin (DE-C 609 129 which is the equivalent of U.S. Pat. No. 1,978,774), epichlorohydrin/polyamide resins (DE-A 14 92 708) and chitosan (DE-A 41 27 604) have been used in particular as an adhesive impregnation for keeping sausages.

To prevent unwanted reaction of the adhesive component of the interior impregnation with the cellulose material of the casing, natural oil, synthetic triglyceride mixture with vegetable fatty acids with a carbon chain length in the range from 4 to 14 carbon atoms, liquid paraffin and/or silicone oil is added to the impregnation. It has also been possible for an emulsifier for the oil to be present.

However, the sausage casing must meet special requirements for specific types of uncooked sausage, such as pepper salami which is coated with a pepper/gelatin layer. Uncooked sausages intended for sale in self-service stores frequently have a second packaging in the form of a film for hygienic reasons. They may also be coated with dip-coating compositions which, as a rule, are transparent. Such coatings, which are composed, for example, of polyvinyl alcohol, are applied to the sausages whose ripening is already complete. Known sausage casings equipped with adhesive impregnations show after the dip coating too strong an adhesion to the sausage filling, while those equipped with non-stick preparations become detached even during ripening. The second packaging or the dip coating alters, inter alia, the water balance of the sausage, which influences the adhesion between the surface of the filling and the casing.

SUMMARY OF THE INVENTION

One object of the present invention is to provide a foodstuff casing with an interior impregnation which solves the deficiencies of the known art. The present invention ensures that the casing does not become detached from the filling during manufacture and storage but, on the other hand, can also be easily peeled after the second packaging or coating with dip-coating compositions.

Another object of the present invention is to provide a cellulose hydrate web which has one side coated with an adhesive component and a non-stick component. Yet another object of the present invention is to provide a foodstuff article which includes a foodstuff article filled with a sausage product.

Another object of the invention is to provide a method for manufacturing an uncooked sausage product. Still another object of the present invention is to provide a coating or impregnation composition.

In accomplishing the foregoing objectives, there has been provided according to one aspect of the present invention a cellulose hydrate substrate which has a coating or impregnation composition present on one side of the substrate. The coating or impregnation composition includes a mixture of about 40 to 200 mg/m$^2$ of an adhesive component, and about 20 to 2,000 mg/m$^2$ of a non-stick component, with the proviso that the ratio by weight of the adhesive to the non-stick component is between about 4:1 and 1:4.

In a preferred embodiment, the web is shaped into the configuration of a foodstuff casing, with the interior of the casing containing the coating or impregnation composition.

The present invention also provides a foodstuff article which includes the foodstuff casing filled with a sausage product. The present invention also provides a process for manufacturing an uncooked sausage. The process includes the steps of filling the foodstuff casing with a sausage, and optionally applying a second packaging in the form of a film or a dip-coating composition.

The present invention also provides a coating composition which contains a mixture of about 40 to 200 mg/m² of an adhesive component, and about 20 to 2,000 mg/m² of a non-stick component, with the proviso that the ratio by weight of the adhesive to the non-stick component is between about 4:1 and 1:4.

Further objects, features and advantages of the present invention will become apparent to persons skilled in the art from the detailed description of preferred embodiments that follows.

DETAILED DESCRIPTION OF THE PREFERRED EMBODIMENTS

The present invention comprises a foodstuff casing based on a cellulose hydrate substrate, which has an interior impregnation with a mixture which generally contains about 40 to 200 mg/m² of an adhesive component and generally contains about 20 to 2,000 mg/m² of a non-stick component, with the proviso that the ratio by weight of adhesive to non-stick component is preferably between about 4:1 and 1:4.

The foodstuff casing is preferably reinforced with fibers, in particular with hemp fibers.

The adhesive component is preferably a natural protein such as casein, gelatin, wheat protein or soybean protein. These proteins are covalently bonded via mono- to dialdehydes to the cellulose. Chitosan is also suitable and can likewise be bonded via aldehydes. Aminoplastic precondensates and polyamine/polyamide/epichlorohydrin resins can also be used.

The non-stick composition is preferably a chromium/fatty acid complex (such as Quilon®), a diketene with long-chain, fat-like substituents (such as Aquapel®), perfluoroethylene (such as Hostaflon®), polyethylene (such as Epotal®) or lecithin. The diketene is the dimer of a ketene of the formula RR'C=C=O, where the radicals R and R' are identical or different and are hydrogen, ($C_4$–$C_{20}$) alkyl, ($C_4$–$C_{20}$)cycloalkyl, ($C_6$–$C_{20}$) aryl or ($C_7$–$C_{20}$)aralkyl, with the proviso that R and R' are not both hydrogen. Preferred diketenes have the stated formula in which one of the radicals R and R' is alkyl, in particular unbranched ($C_8$–$C_{20}$)alkyl. Non-stick compositions which react with the cellulose, such as the diketene or the chromium/fatty acid complex, are generally preferred.

The adhesive component is preferably present in the inner coating in an amount of about 50 to 150 mg/m².

The non-stick component is preferably present in the inner coating in an amount of about 50 to 1200 mg/m².

It is possible, by altering the ratio of adhesive to non-stick component, to adapt the affinity of the sausage casing for the surface of the filling for a particular use. The foodstuff casings according to the invention are generally used as sausage casings in the manufacture of uncooked sausages, in particular keeping sausages, which have a second packaging in the form of film or are coated with a dip-coating composition.

In the case of keeping sausages which, after ripening, are to have a second packaging in the form of a film or, after the casing has been pulled off, are to be coated with gelatin and then with pepper, a peelability of about 1 to 1.5 is generally required (see following Example 1 for the assessment scale). A somewhat stronger adhesion of about 1.5 to 1.75 is generally required for "dip-coated" sausages.

The inner coating preferably contains no other constituents besides those mentioned.

It was surprising that it was possible to achieve the object of the present invention with such a casing because it has always been assumed prior to the invention that the addition of even a small amount of a non-stick component to an adhesive impregnation must inevitably lead to the casing becoming detached during ripening of the keeping sausage. However, this unwanted effect does not occur with the sausage casings according to the present invention.

To manufacture the foodstuff casings according to the invention, an aqueous solution which generally contains a non-stick and an adhesive component and, where appropriate, other conventional additives is introduced into the tube of a fiber-reinforced cellulose casing and subsequently squeezed out with a pair of rolls.

EXAMPLE 1

A 21 g hemp fiber paper was shaped to a tube with a diameter of 75 mm (caliber 75) and coated on the outside with a viscose solution. The tube then passed through the conventional spinning, coagulating and washing baths. Then, before entry into the drier, 10 l of a solution composed of

| | |
|---|---|
| 4.68 l | of water, |
| 4.29 l | of a 7.6% by weight aqueous solution of a diketene from ($C_{16}$–$C_{18}$)alkylketene (Aquapel® x S360, Hercules Inc.) |
| 0.40 kg | of lactalbumin (Rovita®), |
| 0.40 l | of glycerol, |
| 0.19 l | of a 4% by weight aqueous NaOH solution and |
| 0.033 l | of a 40% by weight aqueous glyoxal solution | was introduced into the tube and squeezed out through a pair of rolls. Subsequently, the tube was dried in the inflated state, moistened until it contained 8 to 10% by weight of water and subsequently wound up. The inner coating contained 105 mg/m² casein and had a surface tension of 34 mN/m.

The fiber-reinforced cellulose casing was compressed and then filled with keeping sausage filling with an automatic device. The peelability of the keeping sausage after ripening was complete was 1.75. After the sausage had been coated with a dip-coating composition it was 1.5.

The assessment was based on a scale from 1 to 5 with the following meanings:

| | |
|---|---|
| <1: | the casing becomes detached; |
| 1: | very weak adhesion; |
| >3: | adhesion is so strong that the surface of the filling is torn open on pulling off; |
| 5: | casing can no longer be pulled off without damage. |

EXAMPLE 2

A 17 g hemp fiber paper was shaped to a tube of caliber 60 (diameter 60 mm) and coated on the outside with a viscose solution. The tube then passed through the conventional spinning, coagulating and washing baths. Then, before entry into the drier, 10 l of a solution composed of

| | |
|---|---|
| 6.08 l | of water, |
| 3.076 l | of a 39% by weight aqueous polyethylene dispersion (Epotal ® 181D, BASF AG), |
| 0.30 kg | of lactalbumin (FN4), |
| 0.40 l | of glycerol, |
| 0.12 l | of a 4% by weight aqueous NaOH solution and |
| 0.025 l | of a 40% by weight aqueous glyoxal solution | was introduced into the tube and squeezed out by a pair of rolls. Subsequently the tube was dried in the inflated state, moistened until it contained 8 to 10% by weight of water and subsequently wound up. The inner coating contained 68 mg/m$^2$ of casein and had a surface tension of 34 mN/m.

The fiber-reinforced cellulose casing was compressed and then filled with keeping sausage filling using an automatic device. The peelability of the keeping sausage after complete ripening was 1 to 1.5. After removal of the second packaging it was 1.

EXAMPLE 3

A 21 g hemp fiber paper was shaped to a tube of caliber 80 (diameter 80 mm) and coated on the outside with a viscose solution. The tube then passed through the conventional spinning, coagulating and washing baths. Then, before entry into the drier, 10 l of a solution composed of

| | |
|---|---|
| 8.39 l | of water, |
| 0.60 l | of lecithin 250 W |
| 0.40 kg | of aqueous lactalbumin (FN4), |
| 0.40 l | of glycerol, |
| 0.21 l | of a 4% aqueous NaOH solution |
| 0.033 l | of a 40% by weight aqueous glyoxal solution and |
| 0.0058 l | of ethoxylated isotridecanol (average 8 ethylene oxide units); (Genapol ® X-080 from Hoechst AG) | was introduced into the tube and squeezed out by a pair of rolls. Subsequently the tube was dried in the inflated state, moistened until it contained 8 to 10% by weight of water and subsequently wound up. The inner coating contained 70 mg/m$^2$ of casein and 127 mg/m$^2$ of lecithin and had a surface tension of 34 mN/m.

The fiber-reinforced cellulose casing was compressed and then filled with keeping sausage filling using an automatic device. The peelability of the keeping sausage after complete ripening was 1.75. After coating with a dip-coating composition it was 2.0.

EXAMPLE 4

A 21 g hemp fiber paper was shaped to a tube of caliber 75 (diameter 75 mm) and coated on the outside with a viscose solution. The tube then passed through the conventional spinning, coagulating and washing baths. Then, before entry into the drier, 10 l of a solution composed of

| | |
|---|---|
| 7.46 l | of water, |
| 1.54 l | of a 39 by weight aqueous polyethylene dispersion Epotal ® 181D, BASF), |
| 0.40 kg | of casein |
| 0.40 l | of glycerol, |
| 0.17 l | of a 4% by weight aqueous NaOH solution and |
| 0.033 l | of a 40% by weight aqueous glyoxal solution | were introduced into the tube and squeezed out by a pair of rolls. Subsequently the tube was dried in the inflated state, moistened until it contained 8 to 10% by weight of water and subsequently wound up. The inner coating contained 78 mg/m$^2$ of casein and had a surface tension of 36 mN/m.

The fiber-reinforced cellulose casing was compressed and then filled with keeping sausage filling using an automatic device. The peelability of the keeping sausage after complete ripening was 1.5. After coating with a dip-coating composition it was 1.75.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A foodstuff casing, comprising a cellulose hydrate substrate, and a coating or impregnation composition present on the side of the substrate which forms the interior of said casing, wherein said coating or impregnation composition comprises a mixture of an adhesive component and a non-stick component wherein the ratio of said adhesive to said non-stick component is between about 4:1 and 1:4, by weight, wherein said adhesive component is present on said interior in an amount of about 40 to 200 mg/m$^2$ of said casing and said non-stick component is present on said interior in an amount of about 20 to 2,000 mg/m$^2$ of said casing, and wherein the non-stick composition is selected from the group consisting of a chromium/fatty acid complex, a diketene with $(C_4-C_{20})$alkyl, $(C_4-C_{20})$cycloalkyl, $(C_6-C_{20})$aryl or $(C_7-C_{20})$aralalkyl substituents, perfluoroethylene, polyethylene and lecithin.

2. A foodstuff casing as claimed in claim 1, wherein the adhesive component is selected from the group consisting of a natural protein, chitosan, an aminoplastic precondensate and a polyamine/polyamide/epichlorohydrin resin.

3. A foodstuff casing as claimed in claim 1, wherein the non-stick composition is selected from the group consisting of a diketene with $(C_4-C_{20})$alkyl, $(C_4-C_{20})$cycloalkyl, $(C_6-C_{20})$aryl or $(C_7-C_{20})$aralalkyl substituents, perfluoroethylene, polyethylene and lecithin.

4. A foodstuff casing as claimed in claim 1, wherein the adhesive component is present in the inner coating or impregnation in an amount of about 50 to 150 mg/m$^2$.

5. A foodstuff casing as claimed in claim 1, wherein the non-stick component is present in the inner coating or impregnation in an amount of about 50 to 1200 mg/m$^2$.

6. A foodstuff casing as claimed in claim 1, wherein said casing is reinforced with fibers.

7. A foodstuff casing as claimed in claim 1, wherein said fibers comprise hemp fibers.

8. A foodstuff article, comprising the foodstuff casing of claim 1 filled with a sausage product.

9. A foodstuff casing as claimed in claim 2, wherein the adhesive component comprises a natural protein.

10. A foodstuff casing as claimed in claim 9, wherein the natural protein is selected from the group consisting of casein, gelatin, wheat protein and soybean protein.

11. A foodstuff casing as claimed in claim 1, wherein the non-stick composition comprises a diketene with $(C_4-C_{20})$alkyl, $(C_4-C_{20})$cycloalkyl, $(C_6-C_{20})$aryl or $(C_7-C_{20})$aralalkyl substituents.

12. A foodstuff casing as claimed in claim 11, wherein one of the substituents is a $(C_8-C_{20})$alkyl.

* * * * *